United States Patent [19]

Winsko et al.

[11] Patent Number: 4,952,201
[45] Date of Patent: Aug. 28, 1990

[54] MECHANICAL POWER TRANSMISSION

[76] Inventors: Thomas A. Winsko, 83 Magnolia; Jesse L. Colodner, 22 Walter St., both of Pearl River, N.Y. 10965

[21] Appl. No.: 240,801

[22] Filed: Sep. 6, 1988

[51] Int. Cl.$^5$ ............................................. F16H 3/44
[52] U.S. Cl. ................................... 475/182; 475/210; 474/29; 474/89
[58] Field of Search ...................... 74/793; 474/84, 85, 474/86, 87, 89, 29, 30

[56] References Cited

U.S. PATENT DOCUMENTS

| | | | |
|---|---|---|---|
| 2,101,845 | 12/1937 | Fraser | 74/793 |
| 2,133,593 | 10/1938 | Tautz | 474/89 X |
| 2,171,799 | 9/1939 | Kline | 474/29 X |
| 2,454,991 | 11/1948 | Cooke | 474/29 |
| 2,582,620 | 1/1952 | Colucci | 74/793 |
| 2,941,421 | 6/1960 | Plotti | 74/793 X |
| 3,051,022 | 8/1962 | Way, Jr. | 74/793 |

Primary Examiner—Dirk Wright
Attorney, Agent, or Firm—Iman Abdallah

[57] ABSTRACT

A continuously variable power transmission comprising rotatable input shaft attachable to rotating power means; rotatable output shaft providing driving axle means; and planetary power transmission train interconnecting said input shaft and said output shaft, said planetary power transmission train including a drive input assembly, a variable pulley assembly and a power control mechanism interconnected in such a manner as to permit alteration of the direction and speed of rotation of said output shaft by varying the drive ratio of the pulleys and the driving-driven relationship of the pulleys.

3 Claims, 2 Drawing Sheets

MECHANICAL POWER TRANSMISSION

BACKGROUND OF THE INVENTION

The present invention generally relates to mechanical means for transmitting power from a motor to a driving axle. More specifically, this invention relates to continuously variable power transmission means.

SUMMARY OF THE INVENTION

An object of this invention is to provide power transmission means requiring no torque converter or clutch, nor operational steps to perform these functions.

Another object of the present invention is to provide power tranmission means having additional utility as a clutch, or brake, or variable speed reducer.

A further object of the present invention is to provide power transmission means capable of locking in a neutral position.

Other objects and advantanges of the present invention, as detailed in the following drawings, description of the preferred embodiment and claims, will be apparent to those skilled in the prior art.

The power transmission means of the present invention generally comprises a rotatable input shaft attachable to rotating power means, for example, a fuel-driven motor; a rotatable output shaft providing driving axle means; and a planetary power transmission train including a drive input assembly, a variable pulley assembly and a power control mechanism. The drive input assembly interconnects the rotatable input shaft and the variable pulley assembly. The power control mechanism is disposed between the variable pulley assembly and the rotatable output shaft providing means for varying the speed. and direction of the output shaft as hereinafter described.

PREFERRED EMBODIMENT OF THE INVENTION

Figure 1:
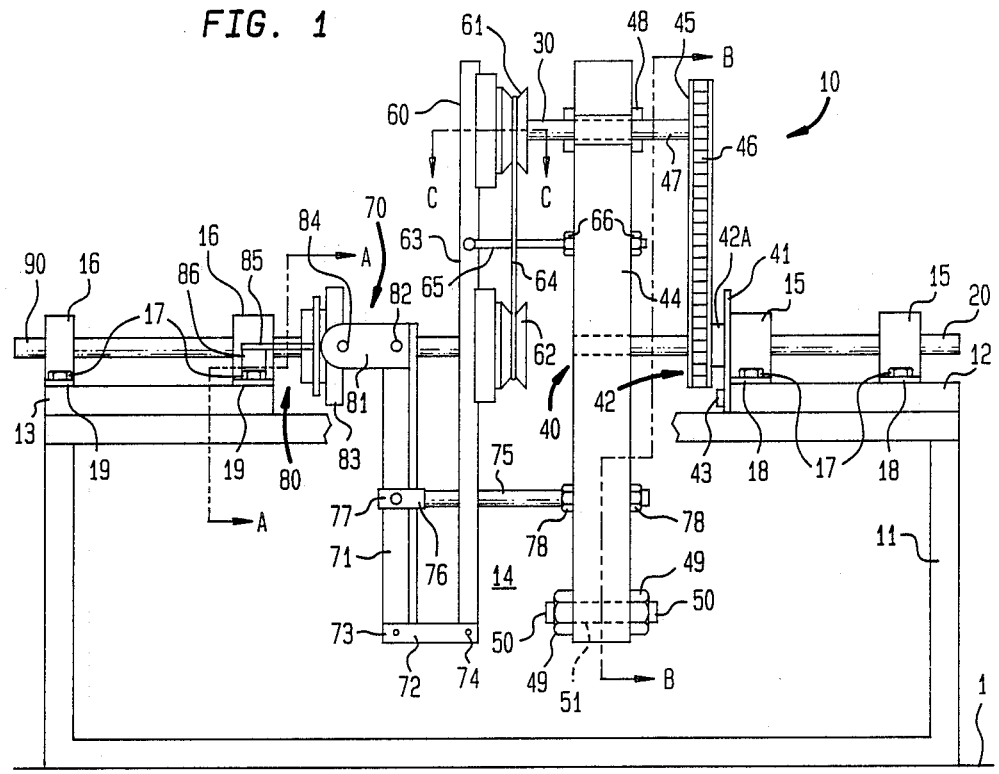
FIG. 1 is a side elevational view of the preferred embodiment of the mechanical power transmission means of the present invention.

FIG. 1 illustrates in a side elevational view of the power transmission means 10 of the present invention the structural relationship of input shaft 20, planetary power transmission train 30 and output shaft 90 for operation in accordance with the present teachings. Power transmission means 10 is shown to include support frame 11 which seats upon the floor or other support surface 1. Support frame 11 included on its top surface integrally constructed, substantially flat transmission support portions 12, 13 at the input and output ends of frame 11, respectively. Cavity 14 is formed within frame 11 between said transmission support portions 12, 13, said planetary train 30 being disposed to rotate within cavity 14.

Transmission 10 is secured to frame 11 by means of paired input shaft pillow boxes 15 and paired output shaft pillow boxes 16, said input shaft 20 and output shaft 90 being journaled within input shaft pillow boxes 15 and output shaft pillow boxes 16, respectively. Pillow boxes 15, 16 are affixed to support portions 12, 13 on each side of the respective shafts 20, 90 by means of bolt fasteners 17 which extend through pillow box flanges 18, 19 to transmission support portions 12, 13.

The free end of input shaft 20 is formed in a manner to permit attachment to a rotating power source, for example, a fuel-driven motor (not shown). Input shaft 20 extends in rotatable cooperation through input shaft pillow boxes 15, stationary sprocket support plate 41 and stationary central sprocket 42 to the drive input assembly 40 of planetary power transmission train 30. Input shaft 20 rigidly attaches to the midpoint of the drive arm 44 of drive input assembly 40. The upper portion of plate 41 extends between central sprocket 42 and the innermost input pillow box 15, said upper portion being fixedly attached to the integrally formed neck 42a of central sprocket 42. The lower portion of plate 41 is attached to the inner wall of input support portion 12 adjacent to cavity 14 by plate bolt fastener 43.

Drive input assembly 40 further includes rotatable transmission drive arm 44 and planetary sprocket 45, said planetary sprocket 45 being vertically aligned with stationary central sprocket 42, said sprockets 42, 45 having similar diameter and teeth spacing for receipt of endless link chain 46. Planetary sprocket 45 is fixedly attached to planetary shaft 47 for rotation therewith, said planetary shaft 47 extending through a transverse opening at one end of drive arm 44 to variable pulley assembly 60. The transverse opening in drive arm 44 includes adjacently disposed bushing 48 about planetary shaft 47 to facilitate rotation of shaft 47. Counter-balances 49 are fixedly secured to each side of the opposite end of drive arm 44 by means of counter-balance nuts 50 which threadedly attach to transversely extending counter-balance shaft 51.

Variable pulley assembly 60 includes vertically-aligned variable-pitch pulleys 61, 62 fixedly attached to pulley rocker arm 63 and rotatably attached to planetary shaft 47 and output shaft 90 as hereinafter described. Planetary pulley 61 is attached at one end of rocker arm 63 and central pulley 62 is attached substantially at the mid-point of rocker arm 63. Pulleys 61, 62 interact in open belt drive by means of endless pulley belt 64 which is disposed in the sheaves of pulleys 61, 62. Pivot rod 65 is pivotally attached to pulley rocker arm 63 at equal spacing between the transverse axes of planetary pulley 61 and central pulley 62. Pivot rod 64 extends from rocker arm 63 to drive arm 44 being attached thereto by means of pivot arm nuts 66 disposed on each side of drive arm 44.

Power control mechanism 70 includes control arm 71 rotatably disposed at one end about the circumference of output shaft 90, extending in parallel alignment with pulley rocker arm 63. The opposite end of control arm 71 is pivotally attached to the adjacent end of pulley rocker arm 63 by means of plate link 72, said plate link 72 being pivotally secured to control arm 71 by control arm pin 73 and to rocker arm 63 by rocker arm pin 74. Drive arm link rod 75 is slidably attached substantially at the midpoint of control arm 71 by means of rod head 76 and extends to drive arm 44. Rod head 76 is fixedly attached to control arm 71 by head pin 77, said rod head 76 being formed to receive drive arm link rod 76 in slidable engagement thereto. Drive arm link rod 75 is secured to drive arm 44 by bolt fasteners 78 disposed on each side of drive arm 44.

Figure 2:
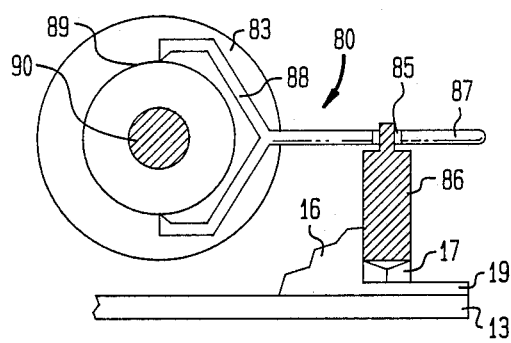
FIG. 2 is a sectional elevational view taken along line A—A of FIG. 1.

The central end of control arm 71 that is rotatably disposed about output shaft 90 is interconnected to power shifter means 80 by paired yokes 81. Yoke 81 is pivotally attached to control arm 71 by means of yoke-control arm pin 82 and to throw out bearing 83 by yoke-bearing pin 84. Throw out bearing 83 is rotatably mounted on output shaft 90. Power shifter means 80 further includes control lever 85. Control lever 85 is rotatably attached to support phalange 86, said phalange 86 being secured to the top surface of bolt fastener 17 of the innermost output pillow box flange 19. As can be best seen in FIG. 2 which illustrates a cross-sectional view taken along line A—A of FIG. 1, control lever 85 of power shifter means 80 includes handle 87 which permits rotation of control clamp 88 about phalange 86. Control clamp 88 engages the small diameter annular surface 89 of throw out bearing 83. By rotation of handle 87, throw out bearing 83 is caused to move laterally along output shaft 90.

Figure 3:
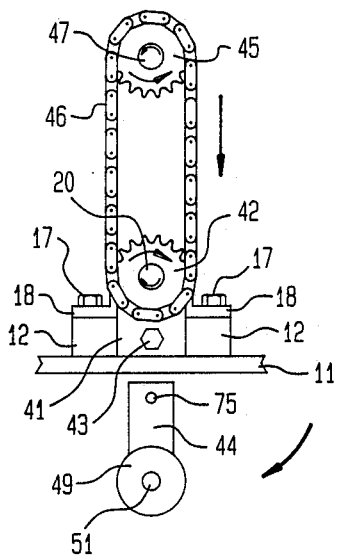
FIG. 3 is a sectional elevational view taken along line B—B of FIG. 1.

For operation of the power transmission means 10 of the present inventions, input shaft 20 is attached to rotating power means for rotation thereby. Referring to FIG. 3, a cross-sectional view taken along line B—B of FIG. 1 which illustrates the rotational cooperation of drive arm 44, central sprocket 42 and planetary sprocket 45, it can be seen that rotation of input shaft 20 is a clockwise direction (as viewed from the output end of transmission 10), for example, causes drive arm 44 to likewise rotate in a clockwise direction. The open drive cooperation of planetary sprocket 45 and stationary central sprocket 42 by means of endless link chain 46 causes planetary sprocket 45 to be rotated in a counterclockwise direction. Rotation of planetary sprocket 45 in a counterclockwise direction causes planetary variable-pitch pulley 61 (FIG. 1) to rotate in a counterclockwise direction through the action of counterclockwise-rotating planetary shaft 47.

Figure 5:
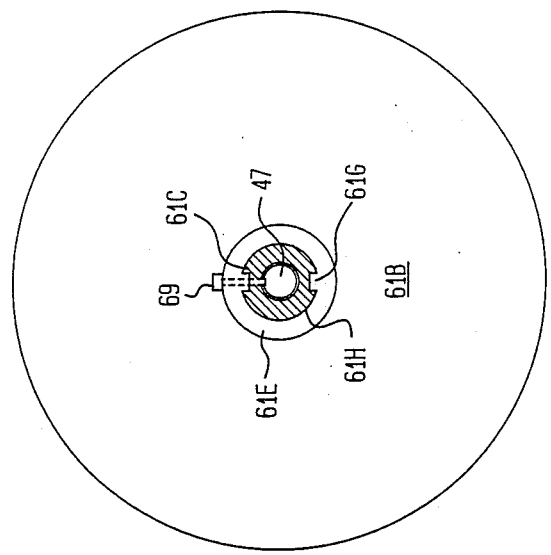
FIG. 5 is a cross-sectional view taken along line D—D of FIG. 4.
Figure 4:
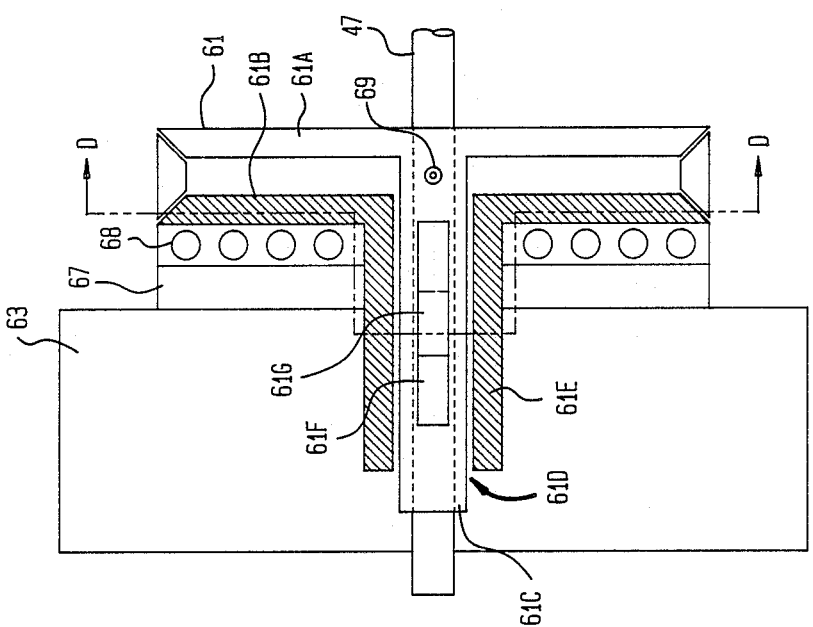
FIG. 4 is a cross-sectional view taken along line C—C of FIG. 1.

Referring now to FIGS. 4 and 5, there is shown in FIG. 4 a cross-sectional view of planetary pulley 61 taken along line C—C in FIG. 1, and in FIG. 5 there is shown a cross-sectional view taken along line D—D in FIG. 4, which illustrate construction and operation that is also typical of central pulley 62. Pulley bearing casing 67 is fixedly attached to pulley rocker arm 63 and houses a plurality of ball bearings 68 disposed adjacent the inner wall of casing 67 and pulley 61. Pulley 61 is formed in two halves, an outer half 61a and inner half 61b. The axial 61e of the inner half 61b of pulley 61 is fixedly attached to pulley rocker arm 63. Outer half 61a is fixedly attached to planetary shaft 47 by means of pulley pin 69. The outer half axial 61c is disposed toward rocker arm 63 within an opening 61d formed in the inner half axial 61e. Outer half axial 61c has a longitudinal slot 61f formed therein for receipt of extending tab 61g formed in the inner circumferential wall 61h of inner axial 61e.

Sliding the inner half 61b away from outer half 61a causes the effective pulley diameter to decrease as pulley belt 64 drops into the pulley sheaves to maintain tension. Likewise, sliding the inner half 61b toward the outer half 61a causes the effective pulley diameter to increase. By reciprocal cooperation of planetary pulley 61 and central pulley 62, that is, when the outer half 61a of planetary pulley 61 is caused to move outwardly, the outer half 62a of central pulley 62 is caused to move inwardly, the operating drive ratio can be changed. Power control mechanism 70 provides means to affect reciprocal cooperation of planetary pulley 61 and central pulley 62.

By rotating handle 87 of power shifter 80 toward planetary train 30 control clamp 88 moves throw out bearing 83 and the central end of attached control arm 71 away from train 30. Pivoting on drive arm link rod 75 the planetary end of control arm 71 is moved toward train 30 affecting pivotal movement of rocker arm 63 whereby the inner half 61b of planetary pulley 61 is slid away fron the outer half 61a and the inner half 62b of central pulley 62 is slid toward the outer half 62a of central pulley 62. Pulley belt 64 adjusts in the sheaves of pulleys 61,62 to maintain tension therby changing the operating drive ration of the variable pulley assembly 60. By subsequent movement of handle 87 the operating drive ratio can be increased or decreased. Rotation of handle 87 away from planetary train reverses the direction of output shaft 90 by changing the drive ratio of the variable-pitch pulleys 61, 62 such that planetary pulley 61 becomes the driving pulley in cooperation with planetary sprocket 45. As heretofore described, the drive ratio of the pulleys 61, 62 can be continuously varied to provide variable power transmission to output shaft 90.

While various changes may be made in the details of the present invention as disclosed without departing from the spirit of the invention, such changes are understood to be within the scope of the description of a preferred embodiment and the appended claims.

What is claimed is:

1. An improvement in continuously variable mechanical power transmissions of the type having a rotatable input shaft that is attaachable to rotating power means and a rotatable output shaft which provides driving axle means, said improvement comprising, a planetary power transmission train including a drive input assembly, a variable-pitch pulley assembly and a power control mechanism, said planetary train being interconnected between said input shaft and said output shaft, and a power transmission support frame rotatably attachable to said input shaft and said output shaft, said drive input assembly comprising a support plate fixedly attached to said power transmission support frame, a central stationary sprocket fixedly attached to said support plate, a planetary sprocket disposed in vertical alignment with said central sprocket, an endless link chain, said central sprocket and said planetary sprocket having similar diameter and teeth spacing for receipt of said endless link chain, and rotatable transmission drive arm, said drive arm being fixedly attached at its midpoint to said rotatable input shaft, said planetary sprocket being held in planetary relation to said central sprocket by a planetary shaft being transversely disposed through one end of said drive arm in rotatable engagement thereto, said drive arm having counter-balances disposed at the opposite end of said drive arm in fixedly attachment thereto, said variable-pitch pulley assembly comprising a pulley rocker arm, a planetary variable-pitch pulley fixedly attached at one end of said rocker arm in rotatable cooperation with said planetary shaft, a central variable-pitch pulley fixedly attached at the midpoint of said rocker arm in rotatable cooperation with said output shaft, an endless pulley belt, said planetary pulley and said central pulley being disposed to interact in open belt drive by means of said pulley belt, said rocker arm being pivotally attached to a pivot rod, said pivot rod being disposed at equal spacing between said planetary pulley and said central pulley.

2. An improvement in continuously variable mechanical power transmissions of the type having a rotatable input shaft that is attachable to rotating power means and a rotatable output shaft which provides driving axle means, said improvement comprising a planetary power transmission train including a drive input assembly, a variable-pitch pulley assembly and a power control mechanism, said planetary train being interconnected to said input shaft and said output shaft, and a power transmission support frame rotatably attachable to said input shaft and said output shaft said drive input assembly comprising a support plate fixedly attached to said power transmission support frame, a central stationary sprocket fixedly attached to said support plate, a planetary sprocket disposed in vertical alignment with said central sprocket, and endless link chain, said central sprocket and said pleanetary sprcket having similar diameter and teeth spacing for receipt of said endless link chain, and rotatable transmission drive arm, said drive arm being fixedly attached at its midpoint to said rotatable input shaft, said planetary sprocket being held in planetary relation to said central sprocket by a planetary shaft being transversely disposed through one end of said drive arm in rotatable engagement thereto, said drive arm having counter-balances disposed at the opposite end of said drive arm in fixedly attachment thereto, said variable-pitch pulley assembly comprising a pulley rocker arm, a planetary variable-pitch pulley fixedly attached at one end of said rocker arm in rotatable cooperation with said planetary shaft, a central variable-pitch pulley fixedly attached at the midpoint of said rocker arm in rotatable cooperation with said output shaft, an endless pulley belt, said planetary pulley and said central pulley being disposed to interact in open belt drive by means of said pulley belt, said rocker arm being pivotally attached to a pivot rod, said pivot rod being disposed at equal spacing between said planetary pulley and said central pulley, said power control mechanism comprising power shifter means, a throw out bearing and a control arm, said control arm being rotatably disposed at one end about the circumference of said output shaft and extending therefrom in parallel alignment with said rocker arm, the opposite end of said control arm being pivotally attached to the adjacent end of said rocker arm by means of a plate link, said control arm being slidably attached to said drive arm by means of a drive arm link rod, the end of said control arm circumferentially disposed about said output shaft being pivotally attached to said throw out bearing by means of a yoke pivotally attached to the surface of said throw out bearing, said power shifter means being rotatably attached to said support frame and including a handle which causes a control clamp to move said throw out bearing longitudinally along said output shaft.

3. A continuously variable mechanical power transmission comprising rotatable input shaft;

rotatable output shaft;

planetary power transmission train including a drive input assembly, variable-pitch pulley assembly and power control mechanism, said planetary train being interconnected to said shaft and said output shaft; and power transmission support frame; wherein said drive input assembly includes a support plate fixedly attache to said power transmission support frame; a central stationary sprocket, said central stationary sprocket having an integrally formed neck that is fixedly attached to said support plate; a planetary sprocket disposed in vertical alignment with said central sprocket; an endless link chain, said central sprocket and said planetary sprocket being disposed in open drive and having similar diameter and similar teeth spacing for receipt of said endless link chain; and a rotatable transmission drive arm, said drive arm having said rotatable input shaft fixedly attached at its midpoint; said planetary sprocket being held in planetary relation to said central sprocket by a planetary shaft being transversely disposed through one end of said drive arm in rotatable engagement thereto, said drive arm having counter-balances disposed at the opposite end of said drive arm in fixedly attachment thereto;

said variable-pitch pulley assembly includes a pulley rocker arm; a planetary variable-pitch fixedly attached at one end of said rocker arm in rotatable cooperation with said planetary shaft; a central variable-pitch pulley fixedly attached at the midpoint of said rocker arm in rotatable cooperation with said output shaft; an endless pulley belt, said planetary pulley and said central pulley being disposed to interact in open belt drive by means of said pulley belt; said rocker arm being pivotally attached to a pivot rod, said pivot rod being disposed at equal spacing between said planetary pulley and said central pulley;

said power control mechanism includes a power shifter means, thro out bearing and a control arm; said control arm being rotatably disposed at one end about the circumference of output shaft and extending therefrom in parallel alignment with said rocker arm, the opposite end of said control arm being pivotally attached to the adjacent end of rocker arm by means of plate link; said control arm being slidably attached to said drive arm by means of drive arm link rod; the end of said control arm that is circumferentially disposed about said output shaft being pivotally attached to said throw out bearing by means of paired yokes, said yokes being pivotally attached to the surface of said throw out bearing; said power shifter means being rotatably attached to said support frame in cooperation with integrally constructed phalange means and includes a handle which permits movement of control clamp to cause the movement of said throw out bearing longitudinally along said output shaft, said control clamp engaging the surface of said throw out bearing;

said transmission support frame having a cavity formed therein, said planetary power transmission train being disposed to rotate within said cavity.

* * * * *